Aug. 22, 1933.                    W. H. SILVER                    1,923,400
                             TRACTOR LISTER CULTIVATOR
                               Filed May 25, 1928            3 Sheets-Sheet 1
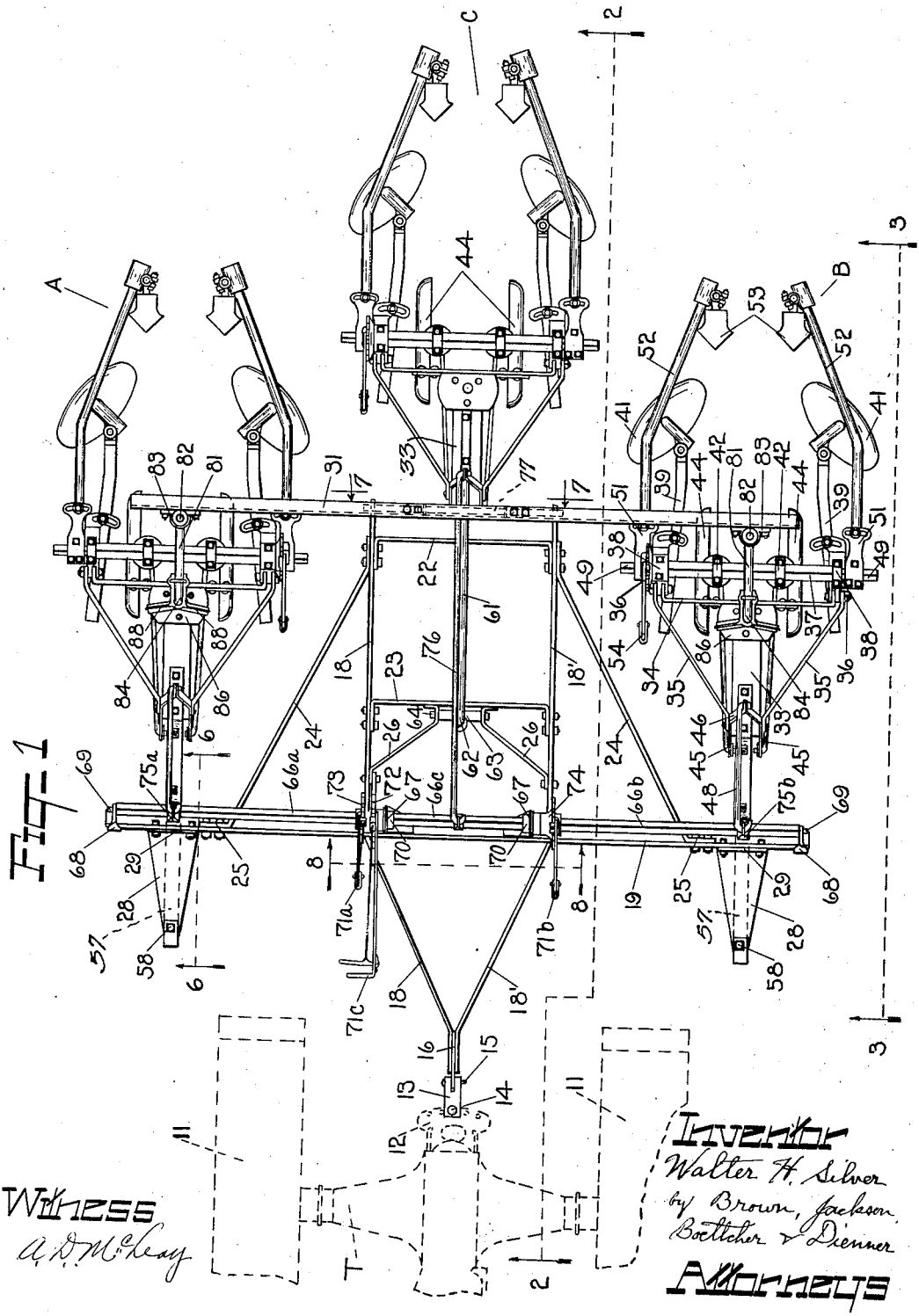

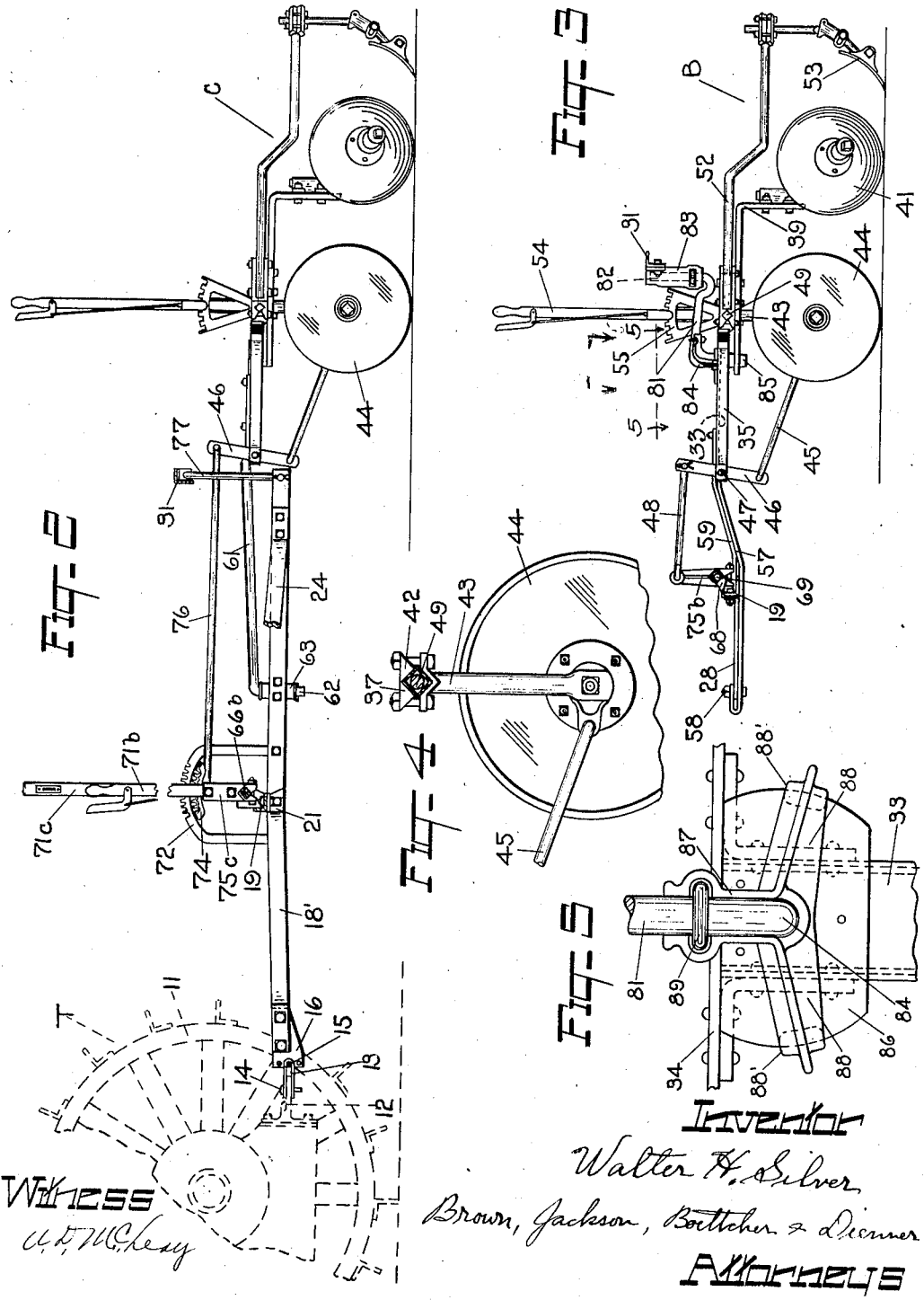

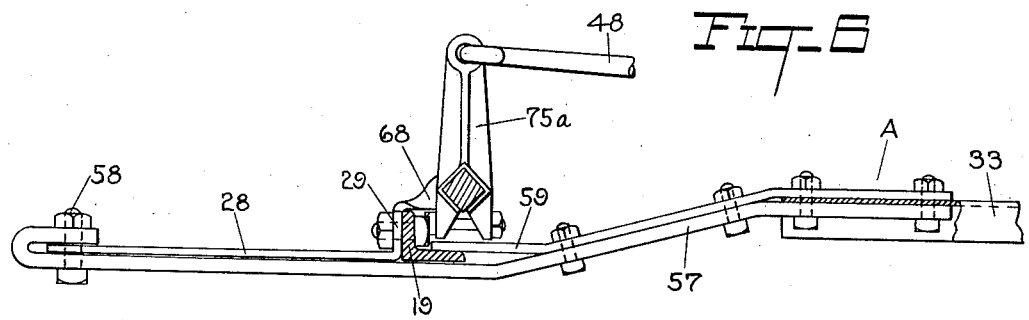
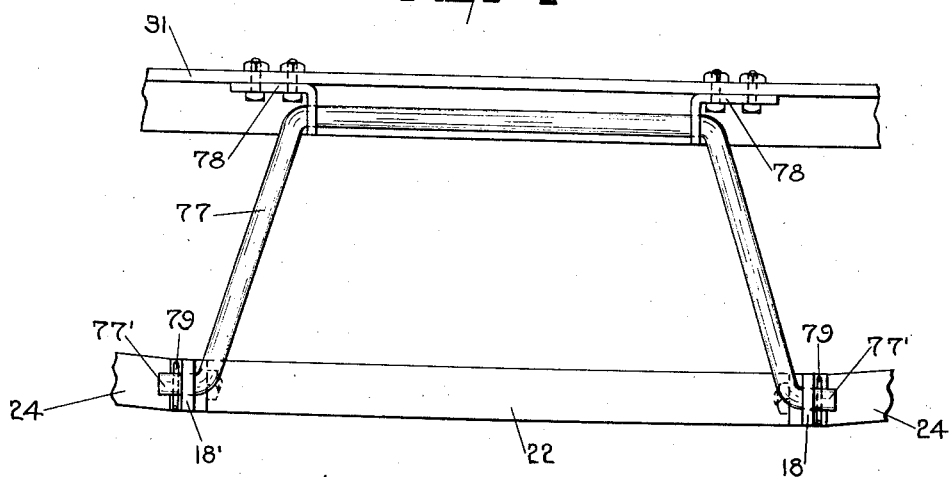
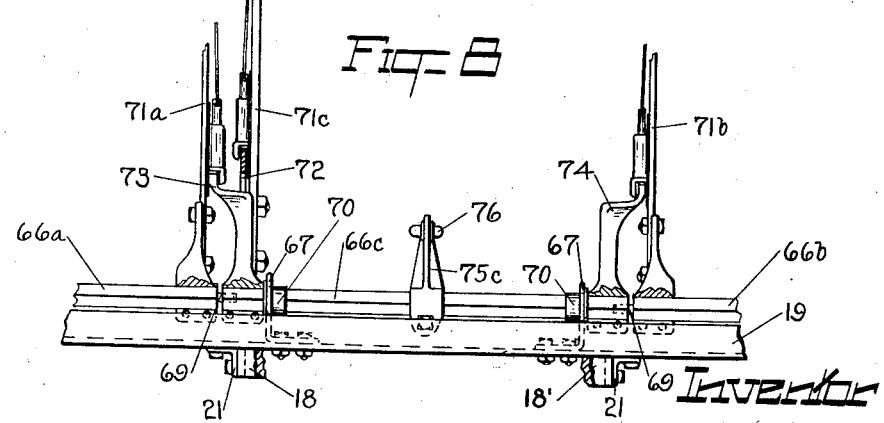

Patented Aug. 22, 1933

1,923,400

UNITED STATES PATENT OFFICE 1,923,400

TRACTOR LISTER CULTIVATOR

Walter H. Silver, Moline, Ill., assignor to Deere & Company, Moline, Ill., a Corporation of Illinois Application May 25, 1928. Serial No. 280,420

45 Claims. (Cl. 97—143)

The present invention relates to lister cultivators, adapted for tractor propulsion, and aims primarily to provide an improved three-row implement of this type.

In attempting to adapt a multiple-row lister cultivator to tractor propulsion, certain problems are encountered which are not present in horse-drawn cultivators. Principal of these is the problem of flexibility, to the end of permitting each cultivator rig or unit to follow lateral and vertical deviations in the listed plant rows without affecting the other rigs and to the end of permitting lateral and fore and aft tilting of the tractor, in passing over uneven ground, without disturbing the cultivating efficiency or the row-following action of the three cultivator rigs. This flexibility must be present at all times and, at the same time each rig must be maintained upright in a stable manner and steady, even draft must be exerted on all three rigs.

In horse drawn cultivators of this type, there is usually one span of horses at one side of the implement and another span of horses at the other side thereof, applying their draft forces at two different points of the implement. It naturally follows that, under this condition, there is a considerable degree of flexibility between the pulling force and the implement. In the case of tractor propulsion, however, the draft forces are all concentrated at one point, to wit, the hitch point or draw bar of the tractor; and, moreover, the tilting of the tractor in passing over uneven ground establishes a condition which is not present in a horse-drawn implement.

The principal object of the present invention is to provide a cultivator of this type which will have the flexibility above referred to under tractor propulsion and the rigs or cultivator units of which will be supported in a stable manner to hold them against tipping laterally.

A further object of the invention is to provide a multiple-row cultivator having a draft frame to which the several rigs or row-following units are operatively connected, the forward portion of the draft frame being adapted to be connected with and carried by a tractor, and its rear portion being carried by means extending transversely of the cultivator and supported on the side rigs or units thereof.

Another object of the invention is to provide a cultivator of the above description, wherein the three cultivator rigs or gangs are disposed in staggered relation, with the intermediate rig disposed in rear of the two lateral rigs, so that the rigs can follow the deviations in the plant rows without interfering with each other, and so that the implement can be turned at the ends of the field without the rigs colliding with each other in said turning movement.

Another object of the invention is to provide a tractor lister cultivator in which the three rigs or gangs are disposed in relatively close proximity to the tractor.

This enables the travel of the implement to be carried up closer to the end of the field and reduces the amount of head land necessary for turning. The construction is such, however, that the tractor can turn at a sharp angle relative to the implement, without the possibility of the rear wheels of the tractor striking any part of the implement.

Another object of the invention is to provide an improved arrangement of controls, whereby all three gangs can be raised or lowered simultaneously, or each of the lateral gangs can be adjusted independently of the others, all from the operator's position on the tractor.

Other objects and advantages of the invention will appear in the following description of the preferred embodiment thereof.

In the accompanying drawings, illustrating such embodiment:

Figure 1 is a plan view of the cultivator, the rear portion of the tractor being illustrated in dotted lines;

Figure 2 is a side view thereof, corresponding to a section taken on the line 2—2 of Figure 1, but omitting the illustration of the gang at the far side of the implement, to avoid obscuring the illustration;

Figure 3 is a side elevational view of one of the side gangs, corresponding to a view taken on the line 3—3 of Figure 1.

Figure 4 is a detail view, illustrating the wheel mounting of one of the gangs;

Figure 5 is a detail plan view, corresponding to a view taken on the line 5—5 of Figure 3 illustrating the bearing which connects each outer gang with the transverse frame supporting bar;

Figure 6 is a detail sectional view, taken approximately on the plane of the line 6—6 of Figure 1;

Figure 7 is a similar view, corresponding to a view taken on the line 7—7 of Figure 1, illustrating the bail mounting of the rear portion of the draft frame, and Figure 8 is a detail view of the three lifting levers and associated lifting bars, corresponding to a section taken approximately on the line 8—8 of Figure 1.

The implement comprises three lister cultivator rigs or gangs, the two outwardly disposed gangs being designated A and B, and the intermediate or center gang being designated C. The two laterally disposed gangs A and B are substantial duplicates, with the exception that one is a left hand unit and the other is a right hand unit, for mounting at the respective sides of the implement.

The intermediate gang C is similar in construction to the two outer gangs A and B, only differing therefrom in the manner in which this gang has its draft connection established with the draft frame, and in the fact that this intermediate gang does not support the transversely extending frame supporting bar hereinafter referred to.

A conventional tractor is indicated at T, comprising the rear traction wheels 11 and the hitch member 12. A clevis 13 is pivotally connected with the hitch member 12 of the tractor by a pin 14, the latter defining a vertical axis about which the clevis 13 can swing horizontally. The rear portion of the clevis is pivotally connected by a horizontal pivot pin 15 with a plate 16 which is secured to the forward portion of the implement draft frame. The pin 15 constitutes a horizontal axis about which a relative fore and aft rocking movement can occur between the tractor and the implement. Referring to Figure 2, it will be seen that the plate 16 is provided with a series of holes to adapt the attachment of the implement to tractors having their hitch members disposed at different heights.

The implement draft frame comprises two draft bars 18, 18', which are secured at their front ends to the plate 16. From this plate, these draft bars diverge outwardly and rearwardly to the transversely extending front frame bar 19, to which the bars 18, 18' are secured by angle brackets 21 (Figures 2 and 8), fastened to the under side of the transverse bar 19 and to the sides of the longitudinal bars 18, 18'. The latter bars extend rearwardly beyond the front frame bars 19, substantially in parallel relation, forming in effect a rearward extension of the draft frame.

The rear portion of said frame extension is braced by a transverse brace bar 22, and the front portion thereof is similarly braced by a transverse bar 23.

Diagonal brace bars 24 are secured to the rear portion of the frame extension and extend outwardly and forwardly to the outer portions of the front frame bars 19, where the diagonal frame bars are secured as indicated at 25. Diagonal bars 26 extend forwardly from the intermediate portion of the transverse brace bar 23 to the sides of the longitudinal frame bars 18, 18'.

Secured to the outer ends of the front frame bar 19, and projecting forwardly therefrom, are draft members 28 in the form of plates having upwardly extending rear flanges 29, which are bolted or otherwise secured to the vertical flange of the frame bar 19, as illustrated in Figure 6. The outwardly disposed gangs A and B have pivotal draft connection with the forward ends of these plates, as will be presently described. The intermediate gang C has pivotal draft connection with the transverse brace bar 23 of the draft frame extension. The weight of the front portion of the draft frame is carried by the tractor T, and the weight of the rear portion of the draft frame is suspended from the transversely extending supporting bar 31, which is, in turn, supported by swinging arms on the two outer gangs A and B. The manner in which the draft connections are established between the draft frame and the three gangs, and the manner in which the desired flexibility between the gangs individually, and between the gangs and the tractor is obtained, will be best understood by first describing the construction of one of the gangs. These gangs have been used extensively in horse-drawn implements and are merely illustrative of one preferred type of gang which I may employ.

They are described in detail in Patent 1,148,613, issued to W. A. Paul, on August 3, 1915, and in my copending application, Serial Number 228,118, filed October 4, 1927, and accordingly, it is not necessary to describe the specific details thereof.

Referring to the gang B, it will be noted that it comprises a frame which is built up of a longitudinally extending channel bar 33 and transversely extending bar 34, at the rear end thereof, the latter bar being rigidly secured to the channel bar by angle brackets, or any other suitable manner. Diagonally extending brace bars or rods 35 are secured at their front ends to the channel member 33 and have their rear ends connected to the transverse bar 34 by bolts 36 which constitute pivots on which a tool carrying frame is pivotally mounted. Such tool carrying frame comprises, primarily, a tubular bar 37, preferably of square cross-section. Secured to the opposite ends of said bar are clamp devices or bracket members 38 which are clamped to the outer surface of the bar and which have forwardly extending pivot eyes having pivotal mounting on the bolts 36. Thus, the tool-carrying bar 37 and the frame 33—34 are capable of vertical pivotal movement relatively to each other about the axis of the bolts 36. Pivotally connected to the under sides of the two brackets 38, for horizontal swinging movement, are rearwardly extending arms 39, which carry suitable earth working tools at their rear ends. In the arrangement shown, I have illustrated discs 41 as being mounted on the arms 39, but it will be evident that shovels or any other desired type of earth working devices may be mounted on these arms in lieu of the discs 41.

The arms 39 are adapted to be swung inwardly or outwardly to vary the distance between the earth working tools carried thereby, and to be clamped in any adjusted position by a suitable arrangement of clamping bolts engaging in curved slots in the brackets 38. It will be understood that the earth working tools can also be set at different angles with respect to their supporting arms 39.

Secured in spaced relation to the intermediate portion of the tubular bar 37 are two clamping devices 42 from which depend vertical standards 43 (see Fig. 4). The lower ends of these two standards have outwardly extending axle spindles upon which are journaled bell wheels 44, 44, which straddle the plant row and which support the tool carrying bar 37. Connected to the wheel carrying standards 43, at points preferably adjacent to the outwardly extending spindle portions, are links 45 which extend upwardly and forwardly to a pivoted yoke 46. Such yoke comprises two spaced straps which extend down on the opposite sides of the channel bar 33, being pivotally connected thereto by a bolt 47 which extends through the channel bar and through both straps of the yoke. The forward ends of the diagonal brace bars 35 may also be secured to this pivot bolt 47. The upper ends of the two straps constituting the yoke 46 are brought together and are pivotally connected to a link 48 extending forwardly to the depth adjusting lever mechanism to be hereinafter described. It will be evident that rocking movement of the yoke 46, effected through such lever mechanism, will be operative to swing the bell wheels 44 forwardly for the purpose of lowering the gang, or will be operative to swing these bell wheels rearwardly for raising the gang.

Referring again to the tubular bar or shaft 37, it will be seen that extending through this shaft and rotatable therein is a second tool carrying shaft 49. Rigidly clamped to the outer ends of the latter shaft are brackets 51 from which extend bars or arms 52. The rear ends of such arms carry suitable earth-working tools 53 which, in the illustrated arrangement, consist of shovels, although it will be evident that any other desired type of cultivating devices may be mounted on the arms. Provision is made for adjusting the two arms 52 of each gang inwardly or outwardly with respect to the plant row, such adjustments being secured by a suitable clamping bolt carried by each arm which effects clamping engagement in a curved slot in the associated bracket 51. These adjustments correspond more or less to the adjustments provided for in the case of the arms 39. The second set of cultivating devices, just described, may be given different depth adjustments relatively to the first set of cultivating devices 41 through actuation of a lever 54. This lever is fixedly secured to the second tool carrying shaft 49, on which the brackets 51 are mounted, and is adapted to have latched engagement with a notched sector 55 which is illustrated as constituting a part of the inner clamping bracket 38. As previously described, such clamping bracket is secured fast to the outer tubular shaft or bar 37, and hence the latched engagement of the lever 54 with the sector 55 will hold the two shafts 37 and 49 in fixed relation to each other. By moving the lever 54 fore and aft an independent depth adjustment can be given the second set of cultivating devices 53, or the cultivating devices can be raised and lowered for the purpose of shaking trash out of the shovels 53.

If desired, a suitable shield may be disposed between the two supporting wheels of each gang to travel along in the bottom of the lister trench over the young plants, in order to prevent the plants from being covered by the soil, or otherwise injured, in the cultivating operation, the use of such shields being old and well-known.

Referring now to the manner of establishing the draft coupling between the draft frame and each gang, it will be observed from Figure 6 that the two outer gangs A and B each has a tongue-like bar 57 bolted to the under side of the channel 33 and extending forwardly therefrom. Such bar passes under the front frame bar 19 and under the forwardly projecting draft plate 28, and has its front end bent backwardly over the upper side of the draft plate 28. A pivot bolt 58 passes downwardly through the looped portion of the bar 57 and through the front end of the draft plate 28. The draft forces of the implement draft frame are hence transmitted to both lateral units A and B through these forwardly advanced pivots 58, which permit each gang to weave inwardly and outwardly in following deviations in their respective lister rows. To relieve the draft plate 28 of carrying the weight of the front portion of the gang and to aid in supporting the draft strains transmitted through the draft plate to draft bar 57, a bar 59 is bolted or otherwise secured to the draft bar 57 and has its front end bearing on top of the horizontal flange of the front frame bar 19. It will be understood that the draft connections just described are duplicated in the case of both lateral gangs A and B.

The draft connection for the intermediate gang C comprises a bar 61 which is rigidly secured to the channel 33 of such intermediate gang and extends forwardly therefrom.

The front end of said bar has a downwardly turned portion 62 (Figure 2) which has pivotal mounting in a pivot block 63, such pivotal mounting establishing a vertical pivot axis around which the intermediate gang can swing laterally from side to side in following deviations in its plant row. Referring to Figure 1, the pivot block referred to comprises laterally extending portions which are confined between the two brace bars 26, a pivot pin 64 extending through such brace bars and through the pivot block for establishing a horizontal pivot axis around which the block can swivel. Hence, the intermediate gang C is also free to rise and fall independently of the draft frame in following vertical deviations in the plant row.

Referring now to the mechanism for lifting and lowering the three gangs between their inoperative and operative positions, and for establishing the main depth adjustments of the gangs, it will be seen from Figures 1 and 8 that a sectionalized shaft extends transversely across the implement and has bearing support on the front frame bar 19. This shaft comprises a right hand section $66^a$, a left hand section $66^b$, and an intermediate section $66^c$, corresponding respectively to the three gangs A, B and C. The intermediate shaft section is rotatably supported in spaced bearing brackets 67 secured to the frame bar 19, and the outer ends of the two outer shaft sections $66^a$ and $66^b$ are rotatably supported in bearing brackets 68 secured to the outer ends of the frame bar 19, the three shaft sections being preferably of square or polygonal section, and the intermediate section $66^c$ having bearing bushings 70 thereon where they pass through the bearing brackets 67.

The ends of the two outer sections $66^a$ and $66^b$ have pin extensions 69, the extensions at the inner ends of said shafts having rotatable bearing support in sockets in the ends of the intermediate shaft section $66^c$ (Figure 8) and the extensions at the outer ends having rotatable bearing support in brackets 68.

Fixedly secured to the three shaft sections are the three levers $71^a$, $71^b$ and $71^c$, respectively. The latch mechanism of the intermediate lever $71^c$ is adapted to cooperate with a stationary latching sector 72 which is rigidly secured to the draft frame. The latch mechanism of the lever $71^a$ is adapted to engage with a latching sector 73 which is secured to and swings with the intermediate shaft section $66^c$. The latch mechanism of the other lever $71^b$ is also adapted to engage with a latching sector 74, secured to and swinging with the intermediate shaft section $66^c$.

The two links 48 referred to in connection with Figure 3 have their forward ends pivotally connected to arms 75ª and 75ᵇ which are secured respectively to the shaft sections 66ª and 66ᵇ, so that when these latter shaft sections are rocked, the two lateral gangs A and B are adjusted vertically. The bell wheels 44 of the intermediate gang C are also swung fore and aft through the swinging movement of a yoke 46, in the same manner described of the two lateral gangs. Referring to Figure 2, the upper end of this yoke is pivotally connected to an arm 75ᶜ, secured to the intermediate shaft section 66ᶜ, whereby rocking movement of said latter shaft section will cause the intermediate gang C to be raised or lowered.

The intermediate adjusting lever 71ᶜ constitutes a master lever, through the actuation of which all three gangs are raised or lowered. Such will be evident from the fact that rocking movement of the intermediate shaft section 66ᶜ, consequent upon swinging movement of the master lever, will transmit similar rocking movement to the lateral shaft sections 66ª and 66ᵇ through the latched engagement of the two other adjusting levers with the latching sectors 73 and 74, which swing with the intermediate shaft section.

The two other levers 71ª and 71ᵇ constitute independent depth adjusting levers, through the actuation of which the two lateral gangs can be adjusted independently of each other and independently of the intermediate gang. Such will be evident from the fact that by releasing either of these levers from its respective sector 73 or 74 the associated shaft section may be rocked independently of the other shaft sections. All three levers are disposed in close proximity to the operator's seat on the tractor and hence they can be conveniently actuated by the operator without the necessity of dismounting from the tractor each time that the implement is to be turned at the end of the field, or an independent depth adjustment is to be established.

I shall now describe the manner of supporting the rear end of the implement draft frame on the two outer gangs A and B, such being one of the important features of the invention, to the end of obtaining the desired flexibility between the three gangs as previously referred to. The rear ends of the two frame bars 18, 18' are supported by a bail-shaped pivot member 77 depending from the transverse supporting bar 31, as shown in Fig. 7. The upper horizontal portion of said bail is pivotally supported in two brackets 78 which are secured to the top flange of the bar 31. The arms of the bail are turned outwardly at their lower ends, as indicated at 77', and these portions pass through apertures in the ends of the frame bars 18, 18', receiving cotter pins 79 or the like on the outer sides of the frame bars to prevent disengagement of the bail ends from the bars. Such construction suspends the weight of the rear portion of the draft frame on the transverse supporting bar 31, while still permitting the latter bar to move fore and aft bodily relatively to the draft frame.

There is sufficient play in the pivotal connections established by the bail 77 to also permit one end of the transverse supporting bar 31 to move forwardly or rearwardly relatively to the draft frame and to the other end of the supporting bar. This is possible because the bail, being loosely carried by the transverse bar 31 and in the same manner supporting the draft frame bars 18 and 18', will allow either of the lateral gangs to swing about the end 82 and thus shorten the distance between points 58 and 82. Since the front frame bar 19 is rigidly carried by the draft frame the bar 31 w̓ constrained to take a position at an angle to the bar 19, within the limits, of course, of the loosely mounted bail connection.

The outer ends of said bar have laterally swinging support on the two outer gangs A and B through the instrumentality of swinging arms 81. The rear portion of each arm has an upwardly turned end 82 which has bearing engagement in a bearing or pivot bracket 83 bolted to the front side of the bar 31 (see Fig. 3). Each arm 81 extends forwardly from the pivot bracket 83 and has a downwardly turned front end 84 which has bearing engagement in a relatively deep bearing socket 85 (Fig. 3) carried by the channel bar 33 of the respective gang. This pivotal mounting of the front end of the arm 81 is additionally reinforced above the channel bar 33 by the provision of a bearing plate 86 which is secured to the channel bar. Referring to Fig. 5, it will be seen that the lateral edges of this plate are curved on arcs having the pivot axis of the downturned bearing portion 84 as their center. Secured to the swinging arm 81 is a cooperating bearing element 87 having two radially projecting arms 88 provided with hook-like ends 88' which embrace the curved edges of the bearing plate 86. The rearwardly extending portion of the arm 81 is clamped in a grooved portion of the bearing element 87 by a U-bolt 89 which embraces the arm 81 and has its ends passing down through holes in the rearwardly extending grooved portion of the bearing element 87. This general construction of bearing has been described in detail in my above-mentioned copending application Serial No. 228,118.

It will be observed that the bearing plate 86 and bearing arms 88 supplement the bearing socket 85 in affording a staunch pivotal support between each swinging arm 81 and its respective cultivator gang. These arms 81 resist the twisting stresses incident to any tipping tendency of the lateral cultivator gangs, holding the same upright in proper cultivating position. At the same time, these arms, pivoted on a vertical axis, permit each lateral gang to swing inwardly or outwardly relatively to the other gangs in following lateral deviations in its plant row.

Any such movement of either lateral gang will occur around the forward draft pivot 58, resulting in a swinging movement of the arm 81 and a forward movement of the corresponding end of the supporting bar 31. Such movement of the supporting bar is accommodated by virtue of the loosely pivoted bail connection between said bar and the draft frame. Simultaneous inward or outward movement of both lateral gangs A and B will result in both ends of the transverse bar 31 moving forwardly. It will hence be observed that this bar has in effect a floating support on the two lateral gangs, transmitting the weight of the rear portion of the draft frame to said gangs, and serving as a stabilizing element for holding said gangs upright, while still permitting relative inward or outward movement between the gangs. The intermediate gang C follows lateral and vertical deviations in its plant row independently of any movement of the bar 31 or of the two lateral gangs. By virtue of having this intermediate gang staggered rearwardly with respect to the lateral gangs, all three gangs can have a considerable degree of lateral movement in following their plant rows or in turning at the ends of the field without the possibility of the gangs colliding with each other.

The pivotal coupling between the draft frame and the tractor T is in effect a universal joint, and there is sufficient play between the parts thereof to prevent transmitting lateral or rocking movement between the tractor and the implement. Thus, if the tractor tilts or rolls laterally in passing over uneven ground such movement is not transmitted to the implement, nor is any fore and aft rocking movement of the tractor. Similarly the implement is free to tilt laterally or longitudinally in passing over uneven ground, without being restrained by its connection to the tractor.

Attention is directed to the fact that all of the cultivator gangs are hitched relatively close to the tractor, this having the advantage of reducing the amount of head land required at the end of the field in which to turn the implement. The location of the draft pivot 58 considerably forward of the two lateral gangs is also advantageous in that when these gangs swing to one side or the other in following their plant rows they are not inclined at any appreciable angle with respect to their rows. By locating these draft pivots on the plates 28 projecting forwardly from the draft frame, the front bar 19 of said frame is spaced sufficiently from the tractor wheels 11 to give ample clearance space for permitting the tractor to be turned sharply without the possibility of said wheels striking any portion of the implement.

While the foregoing construction constitutes what I consider to be the preferred embodiment of my invention, nevertheless it will be understood that such construction is merely exemplary, and can be modified and rearranged considerably without departing from the essence of the invention.

I claim:

1. A tractor lister cultivator comprising outwardly disposed and intermediate cultivator gangs, and draft means supported on said outwardly disposed gangs and flexibly connecting said gangs to the tractor to permit relative vertical and lateral movement between said gangs.

2. A tractor lister cultivator comprising outwardly disposed and intermediate cultivator gangs, a draft frame to which said gangs are flexibly connected for permitting relative vertical and lateral movement between said gangs, and means by which said draft frame is supported at its rear end on said outwardly disposed gangs.

3. A tractor lister cultivator comprising a plurality of cultivator gangs, a draft frame adapted to be supported at its front end on a tractor, means supporting the rear portion of said draft frame on said gangs, and means pivotally connecting the gangs to the draft frame.

4. A tractor lister cultivator comprising outwardly disposed and intermediate cultivator gangs, a draft frame adapted to be supported at its front end on a tractor, means for supporting the rear portion of said draft frame on said outwardly disposed gangs, said gangs being adjustable relative to the draft frame, and means carried by the draft frame effecting said adjustment.

5. A tractor lister cultivator comprising a plurality of cultivator gangs, a draft frame, and means adapted to pivotally connect the front portion of said frame to a tractor, pivotal supporting means mounting the rear portion of said frame on said gangs, including a member pivotally carried by said gangs and a pivotal connection between said member and said frame, and draft connections between said frame and said gangs independent of said pivotal supporting means.

6. A tractor lister cultivator comprising outwardly disposed and intermediate cultivator gangs, a draft frame, means adapted to pivotally connect the front portion of said frame to a tractor, pivotal supporting means for mounting the rear portion of said frame on the two outwardly disposed gangs, including a member pivotally carried by said gangs and a pivotal connection between said member and said frame, and draft connections independent of said pivotal supporting means for pivotally connecting said outwardly disposed gangs to said draft frame.

7. A tractor lister cultivator comprising a plurality of cultivator gangs, a draft frame, means adapted to pivotally connect the front portion of said frame to a tractor, a transverse supporting bar extending adjacent said draft frame and having its end portions mounted on said gangs, means for so mounting the supporting bar, and means for pivotally supporting the rear portion of said draft frame on said supporting bar.

8. A tractor lister cultivator comprising outwardly disposed and intermediate cultivator gangs, a draft frame, means adapted to pivotally connect the front portion of said frame to a tractor, a transverse supporting bar, means pivotally supporting the end portions of said bar on the outwardly disposed gangs, and means pivotally supporting the rear portion of said draft frame on said transverse supporting bar.

9. A tractor lister cultivator comprising outwardly disposed and intermediate cultivator gangs, a draft frame, means adapted to pivotally support the front portion of said frame on a tractor, a transverse supporting bar, swinging arms pivotally mounted on the outwardly disposed gangs and pivotally supporting the end portions of said bar, and pivoted link means between the rear portion of said draft frame and said transverse bar.

10. A tractor lister cultivator comprising two outer lister cultivator gangs disposed substantially in the same transverse plane, an intermediate lister cultivator gang disposed in longitudinally staggered relation with respect to said outer gangs, a draft frame, means adapted to pivotally support the front portion of said frame on a tractor, a transverse supporting bar, arms pivotally mounted on the two outer gangs for horizontal swinging movement, means pivotally supporting the end portions of said transverse bar on said arms, a bail pivotally suspending the rear portion of said draft frame below said supporting bar, and draft means extending forwardly from each of said gangs and pivotally connected with said draft frame.

11. A tractor lister cultivator comprising a plurality of cultivator gangs, a draft frame comprising a front frame bar, means adapted to pivotally connect said draft frame to a tractor, draft members extending forwardly from said gangs, and means pivotally connecting said draft members to said frame comprising brackets extending forwardly from said front frame bar and with which said draft members have pivotal non-sliding connection.

12. A tractor lister cultivator comprising outwardly disposed and intermediate cultivator gangs, a draft frame comprising a transversely extending front frame bar, means adapted to support the front portion of said frame on a tractor for free vertical movement, means pivotally supporting the rear portion of said frame on said outwardly disposed gangs, draft members extending forwardly from said latter gangs, and means pivotally connecting said draft members to said draft frame at points in advance of said front frame bar.

13. A tractor lister cultivator comprising a plurality of cultivator gangs, a draft frame flexibly connecting all of said gangs to a tractor, means connecting the draft frame with the tractor for free pivotal movement relative thereto, and adjusting levers for said gangs mounted on the front portion of said draft frame and adapted to extend forwardly and in proximity to the operator's position on the tractor.

14. A tractor lister cultivator comprising outwardly disposed and intermediate cultivator gangs, a draft frame, means adapted to pivotally connect the front portion of said frame to a tractor, means for supporting the rear portion of said frame on the gangs, a master adjusting lever mounted on the front portion of said draft frame and adapted to extend forwardly and in proximity to the operator's position on the tractor, a pair of independent adjusting levers also mounted on said draft frame and adapted to extend forwardly and in proximity to the tractor, and operating connections between said levers and the gangs whereby actuation of said master lever raises and lowers all of said gangs, and actuation of said independent levers raises and lowers two of said gangs selectively relatively to each other and to the third gang.

15. A lister cultivator adapted for attachment to a tractor having spaced drive wheels, comprising a plurality of cultivator gangs, a rigid draft frame including a front frame bar, means adapted to pivotally connect the front of said draft frame to a point on a tractor, draft members extending forwardly from said gangs, means pivotally connecting said draft members to said frame at points in advance of said front frame bar and spaced outwardly of said drive wheels, and means supporting the rear of said draft frame on said gangs thereby forming a three-point support for said draft frame.

16. A tractor lister cultivator comprising a plurality of cultivator gangs, a rigid draft frame comprising a front frame bar, means adapted to pivotally connect the front portion of said draft frame to a tractor, draft members extending forwardly from said gangs, means pivotally connecting the front of said draft members to said frame at points in advance of said front frame bar, adjusting means for said gangs mounted on said front frame bar, and means supporting the rear of said draft frame on said gangs.

17. A tractor lister cultivator comprising two outer lister cultivator gangs disposed substantially in the same transverse plane, an intermediate lister cultivator gang disposed in longitudinally staggered relation with respect to said outer gangs, a rigid draft frame, means adapted to pivotally support the front portion of said frame on a tractor, a front frame bar on said draft frame, means pivotally connecting the outer cultivator gangs to said draft frame forwardly of the frame bar, means pivotally connecting the intermediate cultivator gang to the draft frame rearwardly of said bar, and means supporting the rear of said draft frames on said two outer gangs.

18. A tractor lister cultivator comprising two outer lister cultivator gangs disposed substantially in the same transverse plane, an intermediate lister cultivator gang disposed in longitudinally staggered relation with respect to said outer gangs, a draft frame, means adapted to pivotally support the front portion of said frame on a tractor, a rear transverse supporting bar, arms pivotally mounted on the two outer gangs for horizontal swinging movement, means pivotally supporting the end portions of said transverse bar on said arms, means supporting the rear portion of said draft frame on said supporting bar, a front frame bar on the draft frame, brackets extending forwardly from the outer ends of said frame bar, means connecting the outer gangs to the forward ends of said brackets, and means connecting the intermediate gang to the draft frame rearwardly of said frame bar.

19. A tractor lister cultivator comprising outwardly disposed and intermediate cultivator gangs, a draft frame comprising a transversely extending front frame bar, means adapted to pivotally support the front portion of said frame on a tractor, means movably supporting the rear portion of said frame on said outwardly disposed gangs, draft members extending forwardly from said latter gangs, means pivotally connecting said draft members to said draft frame at points in advance of said front frame bar, and means pivotally connecting the intermediate gang to the draft frame at points in rear of the front frame bar.

20. A tractor lister cultivator comprising outwardly disposed and intermediate cultivator gangs, a draft frame comprising a transversely extending front frame bar, a pair of spaced frame bars extending generally longitudinally, and at least one transverse bar rigidly connecting the frame bars together, means adapted to pivotally support the front portion of said frame on a tractor, means movably supporting the rear portion of said frame on said outwardly disposed gangs, draft members extending forwardly from said outwardly disposed gangs, and means pivotally connecting said draft members to said draft frame at points in advance of said front frame bar.

21. A tractor lister cultivator comprising outwardly disposed and intermediate cultivator gangs, a draft frame comprising a transversely extending front frame bar, a pair of spaced frame bars extending generally longitudinally, and at least one transverse bar rigidly connecting the frame bars together, means adapted to pivotally support the front portion of said frame on a tractor, means movably supporting the rear portion of said frame on said outwardly disposed gangs, draft members extending forwardly from said outwardly disposed gangs, means pivotally connecting said draft members to said draft frame at points in advance of said front frame bar, and means pivotally connecting the intermediate gang to the draft frame at points in rear of the front frame bar.

22. A tractor lister cultivator comprising a plurality of cultivator gangs, a draft frame comprising a front frame bar, means adapted to pivotally connect said draft frame to a tractor, draft members extending forwardly from said gangs, brackets extending forwardly from said frame bar, means pivotally connecting the draft members to said forwardly extending brackets, and means on said draft members to slidably engage said frame bar and hold the draft members aaginst vertical displacement relative to said bar.

23. A tractor lister cultivator comprising outwardly disposed and intermediate cultivator gangs, a draft frame comprising a transversely extending front frame bar, means adapted to support the front portion of said frame on a tractor for free swinging movement relative thereto, means pivotally supporting the rear portion of said frame on said outwardly disposed gangs for fore and aft swinging movement, draft members extending forwardly from said latter gangs, and means pivotally connecting said draft members to said draft frame.

24. In combination, a cultivator comprising spaced gangs, a rigid draft frame adapted to be supported at its front end on a propelling means, means pivotally connecting said spaced gangs at their forward ends to said draft frame for the transmission of draft to said gangs and means supporting the rear end of said draft frame on said gangs at points remote from the draft connection of the gangs to the draft frame, the latter means providing for free pivotal movement of the gangs about their points of draft connection to the draft frame.

25. In combination, a cultivator comprising spaced gangs, a rigid draft frame adapted to be supported at its front end on a propelling means, means pivotally connecting said spaced gangs at their forward ends with said draft frame for the transmission of draft to said gangs, and means pivotally supporting the rear end of said draft frame on said gangs at points remote from the draft connection of the gangs with the draft frame, the latter means providing for pivotal movement of the gangs about their points of draft connection with the draft frame, said draft frame being entirely supported on the propelling means and the spaced gangs.

26. In combination, a cultivator comprising spaced gangs, a rigid draft frame adapted to be supported at its front end on a propelling means, means pivotally connecting said spaced gangs at their forward ends to said draft frame for the transmission of draft to said gangs, and means supporting the rear end of said draft frame on said gangs at points remote from the draft connection of the gangs to the draft frame including means holding said gangs from lateral tilting, the means supporting the rear end of the draft frame on the gangs permitting relative lateral movement between said gangs.

27. In combination, a cultivator comprising spaced gangs, a rigid draft frame adapted to be supported at its front end on a propelling means, means pivotally connecting said spaced gangs at their forward ends to said draft frame for the transmission of draft to said gangs, and means supporting the rear end of said draft frame on said gangs at points remote from the draft connection of the gangs to the draft frame, the latter means permitting pivotal movement of the gangs about their points of draft connections to the draft frame and holding the gangs from tilting laterally.

28. In combination, a cultivator comprising spaced gangs, a rigid draft frame adapted to be supported at its front end on a propelling means, means pivotally connecting said gangs at their forward ends to said draft frame for the transmission of draft to said gangs, and means supporting the rear end of said draft frame on said gangs at points remote from the draft connection of the gangs to the draft frame and including a transverse supporting member and means connecting said member with the gangs for preventing the gangs from tilting laterally.

29. In combination, a cultivator comprising spaced gangs, a rigid draft frame adapted to be supported at its front end on a propelling means for horizontal swinging relatively thereto, means connecting said gangs at their forward ends to said draft frame for the transmission of draft to said gangs, a transverse bar, means supporting said bar on said gangs at points remote from the draft connection of the gangs to the draft frame and holding the gangs from tilting laterally, and means supporting the rear end of said draft frame from said bar at two spaced points, thereby providing a three-point support for the draft frame.

30. In combination, a cultivator comprising spaced gangs, a rigid draft frame adapted to be supported at its front end on a propelling means for horizontal swinging relative thereto, means pivotally connecting said gangs at their forward ends to said draft frame for the transmission of draft to said gangs, a transverse bar, means supporting said bar on said gangs at points remote from the draft connection of the gangs to the draft frame providing for relative lateral movement between the gangs and preventing the gangs from tilting laterally, and means depending from said bar for supporting the rear end of said draft frame in substantially level position at two widely spaced points, thereby giving a three-point support for the draft frame to prevent tilting thereof relative to the gangs.

31. In combination, a cultivator comprising spaced gangs, a rigid draft frame adapted to be supported at its front end on a propelling means, means pivotally connecting said gangs at their forward ends to said draft frame for the transmission of draft to said gangs, and means supporting the rear end of said draft frame on said gangs at points remote from the draft connection of the gangs to the draft frame providing for relative lateral movement between said gangs and holding the gangs from lateral tilting, said latter means comprising a transverse supporting member, connections between said member and the gangs, and connections between said member and the draft frame providing for relative fore and aft movement between said member and the draft frame whenever the gangs move laterally.

32. In combination, a cultivator comprising spaced gangs, a rigid draft frame adapted to be supported at its front end on a propelling means, means connecting said gangs at their forward ends to said draft frame for the transmission of draft to said gangs, a transverse bar, means supporting said bar on said gangs at points remote from the draft connection of the gangs to the draft frame providing for relative lateral movement between the gangs and effecting holding of the gangs from tilting laterally, and means supporting the rear end of said draft frame from said bar permitting relative longitudinal movement between the draft frame and bar whenever the gangs move laterally with respect to the draft frame.

33. In combination, a cultivator comprising spaced gangs, a rigid draft frame adapted to be supported at its front end on a propelling means, means pivotally connecting said gangs at their forward ends to said draft frame for the transmission of draft to said gangs, a transverse bar, means supporting said bar on said gangs at points remote from the draft connection of the gangs to the draft frame permitting relative lateral movement between the gangs and effecting holding of the gangs from tilting laterally, and means supporting the rear end of said draft frame on said bar permitting limited fore and aft movement between said draft frame and bar whenever the gangs move laterally with respect to the draft frame, said draft frame being exclusively supported by the propelling means and the gangs.

34. A tractor lister cultivator comprising outwardly disposed and intermediate cultivator gangs, draft means flexibly connecting said gangs to a tractor to permit relative lateral movement between said gangs, and means supporting the forward portion of the draft means on the tractor and the rear portion thereof on certain of said gangs.

35. A tractor lister cultivator comprising outwardly disposed and intermediate cultivator gangs, draft means flexibly connecting said gangs to a tractor to permit relative lateral movement between said gangs, and means supporting the forward portion of the draft means on the tractor and the rear portion thereof on said outwardly disposed gangs only.

36. A tractor lister cultivator comprising outwardly disposed and intermediate cultivator gangs, draft means for the gangs supported partly on a tractor and partly on the outwardly disposed gangs, and means connecting the intermediate gangs with the draft means for vertical movement relatively thereon.

37. In combination, a cultivator comprising spaced gangs, a rigid draft frame adapted to be supported partly on a propelling means and partly on the gangs and including a transverse member, a second transverse member connected with the draft frame, means connecting the gangs with one of said members to transmit draft thereto, and means connecting the other of said memers with said gangs to support a portion of the frame on said gangs.

38. In combination, a cultivator comprising spaced gangs, a rigid draft frame adapted to be supported partly on a propelling means and partly on the gangs and including a transverse member, a second transverse member connected with the draft frame, means connecting the gangs with one of said members to transmit draft thereto, and means including relatively movable parts connecting the other of said members with said gangs to support a portion of the frame on said gangs and to provide for movement of said spaced gangs relative to said other transverse member and to each other.

39. In combination, a cultivator comprising spaced gangs, a rigid draft frame adapted to be supported partly on a propelling means and partly on the gangs and including a transverse member, a second transverse member connected with the draft frame, means connecting the gangs with one of said members to transmit draft thereto, and means loosely connecting the other of said members with said gangs to support a portion of the frame on said gangs and to provide for a limited amount of relative movement between said other member and the draft frame.

40. In combination, a cultivator comprising spaced gangs, a rigid draft frame adapted to be supported at its front end on a propelling means and including a transverse member for pivotally connecting said spaced gangs at their forward ends to said draft frame for the transmission of draft to said gangs, and means supporting the rear end of said draft frame on said gangs at points remote from the draft connection of the gangs with the draft frame including a second transverse member loosely connected with the draft frame.

41. The combination, of a cultivator comprising spaced gangs, a rigid draft frame adapted to be supported partly on a propelling means and partly on the gangs and including front and rear transverse members, means connecting the gangs with the front transverse member to transmit draft thereto, and means connecting the rear transverse member with said gangs to support a portion of the draft frame thereon.

42. The combination, of a cultivator comprising spaced gangs, a rigid draft frame adapted to be supported partly on a propelling means and partly on the gangs and including front and rear transverse members, means connecting the gangs with the front transverse member to transmit draft thereto, and means movably mounting the rear transverse member of the draft frame on said gangs.

43. The combination, of a cultivator comprising spaced gangs, a rigid draft frame adapted to be supported partly on a propelling means and partly on the gangs and including front and rear transverse members, means pivotally connecting the gangs with the front transverse member to transmit draft thereto, and means movably mounting the rear transverse member of the draft frame on said gangs.

44. A cultivator comprising a plurality of cultivator gangs, a draft frame including a front frame bar, draft members extending forwardly from the gangs, means movably connecting said draft members with said frame at points in advance of said frame bar, and means carried by the draft members and movably connected with said frame bar to hold the draft members against vertical displacement relative to said bar.

45. A tractor lister cultivator comprising two outer lister cultivator gangs disposed substantially in the same transverse plane, an intermediate lister cultivator gang disposed in longitudinally staggered relation with respect to said outer gangs, a draft frame, means adapted to pivotally support the front portion of said frame on a tractor, a transverse supporting bar, means movably supporting the end portions of said transverse bar on the two outer gangs, a bail pivotally suspending the rear portion of said draft frame below said supporting bar, and means extending forwardly from each of said gangs and movably connected with said draft frame.

WALTER H. SILVER.

CERTIFICATE OF CORRECTION.

Patent No. 1,923,400.                                                          August 22, 1933.

WALTER H. SILVER.

It is hereby certified that error appears in the printed specification of the above numbered patent requiring correction as follows: Page 6, line 22, claim 13, for "relative" read relatively; and line 84, claim 17, for "frames" read frame; page 7, line 11, claim 22, for "aaginst" read against; line 30, claim 24, insert a comma after "gangs"; line 76, claim 27, for the "syllable "nections" read nection; and line 107, claim 30, for "relative" read relatively; page 8, line 46, claim 36, for "gangs" read gang; and line 47, for "thereon" read thereto; same page, line 56, claim 37, for "memers" read members; and that the said Letters Patent should be read with these corrections therein that the same may conform to the record of the case in the Patent Office.

Signed and sealed this 21st day of November, A. D. 1933.

F. M. Hopkins (Seal)                                                     Acting Commissioner of Patents.